G. S. BAKER.
BAKER'S OVEN.
APPLICATION FILED MAR. 14, 1913.
1,141,599.
Patented June 1, 1915.
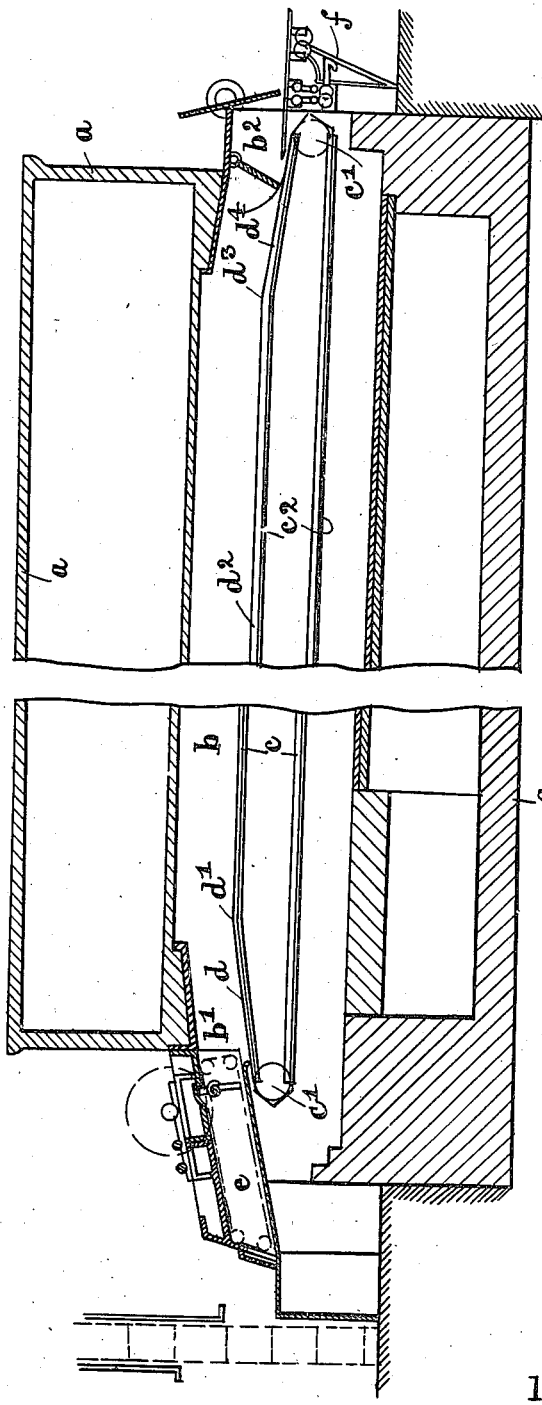
Witnesses
C. A. Walter
L. G. Anger
Inventor
George Samuel Baker
by
Attorney

UNITED STATES PATENT OFFICE.

GEORGE SAMUEL BAKER, OF LONDON, ENGLAND.

BAKER'S OVEN.

1,141,599. Specification of Letters Patent. Patented June 1, 1915.

Application filed March 14, 1913. Serial No. 754,340.

*To all whom it may concern:*

Be it known that I, GEORGE SAMUEL BAKER, of the firm of Joseph Baker & Sons Ltd., a subject of the King of England, residing at Willesden Junction, N. W., London, in England, have invented certain new and useful Improvements in and Relating to Bakers' Ovens, of which the following is a specification.

This invention relates to bakers' ovens of the traveling sole plate type, and the invention primarily comprises a novel construction or arrangement of the baking chamber whereby goods to be baked and fed into said chamber are subjected in a more efficient manner than hitherto to the heat of the oven and to steam arising from the goods already under treatment, this result being effected by causing the forward or inlet end of the base of the baking chamber to assume for a short distance a more or less sharp rise or upward inclination, which is then followed by a gentle downward declivity of the said base to a point near the discharge end from which latter point to the actual discharge the base may be given a still sharper downward inclination, the lowermost point at said discharge end being preferably in a lower plane than the lowest part of the base at the inlet. The upper run of the traveling sole plate which in effect constitutes the base of the chamber obviously follows the course above described. By this means the heat in the baking chamber and steam given off by goods being baked rises to the uppermost part of the sole or base which is close to the inlet end of the chamber so that goods to be baked are quickly introduced to the most heated air and to the greatest volume of steam, which prevents the formation of an outer hardened crust on the goods and insures a more complete baking throughout, thus improving the quality and appearance of the baked goods.

The invention is hereinafter fully described and the novel features specifically pointed out in the appended claims, reference being made to the accompanying drawing which is a longitudinal section of an oven to which the present invention has been applied with automatic feed and discharge devices represented diagrammatically.

In the drawing, $a$ designates the framing or masonry of the oven which together with the flues may be of any desired or conventional form and form no part of the present invention, and $b$ is the baking chamber having the inlet opening $b^1$ and the discharge opening $b^2$. Within said baking chamber is the traveling sole plate $c$, the upper run or stretch of which constitutes the effective base of the chamber, said sole plate passing at each end about polygonal rollers $c^1$, $c^1$ and being conducted in the course desired by guides $c^2$. The said upper run of the sole plate is so guided that commencing at or about the inlet aperture $b^1$ it rises somewhat sharply for a short distance as at $d$ to a point $d^1$ which is the highest part of the base and is then followed by a portion $d^2$ which declines gently downward to a point $d^3$ near the discharge opening $b^2$ from which latter point the sole plate inclines more sharply as at $d^4$ to its outlet end, the latter thus being at a lower plane than the corresponding part at the inlet end.

It will be observed that the ends of the traveling sole plate—that is, the greater inclined end portions, extend so as to directly underlie the feeding and discharge parts or mechanisms at the opposite ends of the ovens, so that the material being fed into the oven may be placed directly upon the inclined portion of the plate at the feed end of the machine, and taken directly from the inclined portion at the discharge end of the machine, thereby facilitating the loading and unloading of the oven; and enabling the projecting of the opposite ends of the sole plate outwardly from the actual baking chamber where the loading and unloading may be accomplished at points relatively cool compared to the heat of the baking chamber itself.

The purpose of this construction is stated above, and it will be obvious that the heated air and steam will rise and flow along the chamber, and accumulate to the greatest extent at or about the point $d^1$, where the goods soon after entering the chamber are subjected to the influence thereof.

In this figure an automatic feeding device is designated as a whole by the character $e$ and a discharge device by $f$, but these devices form no part of the present invention but are the subject of divisions of this application.

What I claim as my invention and desire to secure by Letters Patent of the United States is:—

1. In a baker's oven, a baking chamber having an inlet at one end and an outlet at the other end and an endless sole plate adapted to travel through said chamber and directly receive the goods to be baked, said sole plate at the inlet end of said chamber being inclined upwardly for a short distance, then inclined downwardly in a rectilinear path with a gentle declivity to near the discharge end, and then again more sharply downwardly in the same direction to its termination substantially as and for the purpose described.

2. In a baker's oven, a baking chamber having an inlet at one end and an outlet at the other end and an endless sole plate adapted to travel in a circuitous path through said chamber and directly receive the goods to be baked, said sole plate at the inlet end of said chamber being inclined upwardly for a short distance, then inclined downwardly in a rectilinear path with a gentle declivity to a point adjacent the discharge end of said chamber, and thence again more sharply downwardly in the same direction to said discharge end, the lowermost part of the discharge end of the sole plate being in a lower plane than the corresponding lowermost part of the sole plate at the inlet end substantially as and for the purpose described.

3. In a baker's oven, a baking chamber having feeding and discharge devices associated therewith, and movable supporting means within the baking chamber for initially elevating the material being baked to a relatively high point in the oven, and for lowering said material as it approaches the outlet of the oven, said movable supporting means projecting outwardly below a part of the feeding means substantially as described.

4. In a baker's oven, a baking chamber having feeding and discharge devices associated therewith, and movable supporting means within the baking chamber for initially elevating the material being baked to a relatively high point in the oven, and for lowering said material as it approaches the outlet of the oven, said movable supporting means projecting outwardly in opposite directions below portions of said feeding and discharging means.

5. In a baker's oven, a baking chamber having feeding and discharge devices associated therewith, and movable supporting means within the baking chamber for initially elevating the material being baked to a relatively high point in the oven, and for lowering said material as it approaches the outlet of the oven, said movable supporting means projecting at its feed end outwardly beyond the baking chamber.

6. In a baker's oven, a baking chamber having feeding and discharge devices associated therewith, and movable supporting means within the baking chamber for initially elevating the material being baked to a relatively high point in the oven, and for lowering said material as it approaches the outlet of the oven, said movable supporting means projecting at opposite ends outwardly beyond the baking chamber.

In witness whereof I have signed this specification in the presence of two witnesses.

GEORGE SAMUEL BAKER.

Witnesses:
O. J. WORTH,
H. D. JAMESON.